(12) United States Patent
Shaffer et al.

(10) Patent No.: US 7,398,429 B2
(45) Date of Patent: Jul. 8, 2008

(54) SYSTEM AND METHOD FOR TRACING AND LOGGING FOR SOFTWARE MODULE

(75) Inventors: Shmuel Shaffer, Palo Alto, CA (US); Joseph Khouri, San Jose, CA (US); Gebran Chahrouri, Menlo Park, CA (US); Labhesh Patel, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 534 days.

(21) Appl. No.: 11/050,036

(22) Filed: Feb. 3, 2005

(65) Prior Publication Data

US 2006/0174165 A1    Aug. 3, 2006

(51) Int. Cl.
*G06F 11/00* (2006.01)
(52) U.S. Cl. .............................. 714/45; 714/20; 714/38; 714/39; 718/104
(58) Field of Classification Search .................. 714/45, 714/39, 20
See application file for complete search history.

(56) References Cited

U.S. PATENT DOCUMENTS

| 6,083,281 A | 7/2000 | Diec et al. |
| 2002/0198983 A1* | 12/2002 | Ullmann et al. ............. 709/224 |
| 2003/0061550 A1* | 3/2003 | Ng et al. ...................... 714/45 |
| 2005/0223282 A1* | 10/2005 | Frey et al. .................... 714/20 |
| 2005/0223283 A1* | 10/2005 | Frey et al. .................... 714/20 |

* cited by examiner

*Primary Examiner*—Yolanda L Wilson
(74) *Attorney, Agent, or Firm*—Trellis Intellectual Property Law Group, PC

(57) ABSTRACT

A method and system for tracing and logging for a software module is provided. The method includes the steps of detecting at least one error and analyzing at least one error message corresponding to each detected error. The method further includes the step of monitoring the resources of a computer system. Further, the method includes the step of adjusting (e.g., automatically adjusting) a tracing and logging level, based on the analysis of the error messages and the availability of resources.

23 Claims, 5 Drawing Sheets

SYSTEM AND METHOD FOR TRACING AND LOGGING FOR SOFTWARE MODULE

BACKGROUND OF THE INVENTION

1. Field of Invention

Embodiments of the present invention relate in general to tracing and logging of one or more software modules. More specifically, embodiments of the present invention relate to methods and systems for controlling the level of tracing and logging for software modules.

2. Description of the Background Art

The present age has witnessed a growing need for software modules in various applications. This has resulted in the development of sophisticated software modules, and consequently, more complex computer program codes. The increasing complexity of computer program codes results in higher potential for the occurrence of errors during the execution of the software modules. Debugging tools are used to remove these errors. Debugging is the process of finding and removing errors from the software module. However, identification of the root cause of an error message requires information about the exact sequence of steps performed during the execution of the software module.

Tracing and logging is a technique used to trace the exact sequence of steps performed, and keeping a record of these traces. Tracing and logging is characterized by multiple tracing and logging levels. Each tracing and logging level determines the extent of tracing. A high tracing and logging level implies a detailed tracing of the sequence of steps performed. However, the higher the tracing and logging level, the greater is the impact on the resources associated with the computer system in which the software module resides. This may adversely affect the performance of the software module.

To prevent this adverse effect on the performance, existing systems use a low tracing and logging level. This provides broad-level information pertaining to the sequence of steps performed, and gives a general overview of the cause of the error. Thereafter, the tracing and logging level is adjusted manually to a level that enables the identification of the root cause of the occurrence of the error.

Since adjustment of the tracing and logging level is done manually, the exact required level is not achieved in the first iteration. Therefore, multiple iterations are required to achieve the required tracing and logging level. This makes tracing and logging a time-consuming process. Further, at times, the availability of the resources decreases, and hence, the tracing and logging level needs to be lowered. The lowering of the tracing and logging level is also done manually, and hence, is also time-consuming. Further, the decreased availability of the resources may affect the performance of the software module. Also, when debugging is done on an operational system at customer's site, the process necessitates the re-occurrence of the issue, resulting in repeated service degradation and reduced customer satisfaction.

SUMMARY OF EMBODIMENTS OF THE INVENTION

In one embodiment, the invention provides a method for tracing and logging for a software module. The method comprises: (i) detecting at least one error in a software module in a computer system having a plurality of software modules, (ii) generating at least one error message corresponding to each detected error, and (iii) analyzing the error message to identify the software module which produced the error message. The method further provides (iv) monitoring the resources of the computer system to determine available resources that may be employed for enhancing a tracing and logging level in the software module, and (v) enhancing the tracing and logging level in the software module to determine the root cause of the error message. A system and a computer-readable medium are provided for performing the tracing and logging in the software module.

In another embodiment, the present invention provides a method for tracing and logging for a software module. The method comprises: (i) detecting at least one error in a software module in a computer system having a plurality of software modules, (ii) generating at least one error message corresponding to each detected error, and (iii) analyzing the error message to identify the software module which produced the error message. The method further provides; (iv) monitoring the resources of the computer system to determine available resources that may be employed for adjusting a tracing and logging level in the software module, and (v) adjusting the tracing and logging level in the software module based on the analyzed error message and the availability of resources. The method may further provide determining that the availability of resources has decreased, and the adjusting the tracing and logging level in the software module may include reducing the tracing and logging level in the software module. A system and a computer-readable medium are provided for performing the tracing and logging in the software module.

Further embodiments of the invention provide a method for tracing and logging of one or more software modules having multiple tracing and logging levels, wherein each tracing and logging level determines the amount of information contained in tracing and logging which includes generating logs pertaining to the operations of the one or more software modules. The method comprises: (i) detecting at least one error in one or more software modules in a computer system having a plurality of the software modules, (ii) generating at least one error message corresponding to each detected error, (iii) analyzing the error message to identify the one or more software modules which produced the error message, (iv) monitoring the availability of resources of the computer system to determine available resources that may be associated with the one or more software modules to adjust at least one tracing and logging level, and (v) adjusting the tracing and logging level in one or more software modules based On the analyzed error message and availability of the resources. The method may further comprise monitoring the load on the resources and evaluating the resources that can be used to adjust the tracing and logging level.

In another embodiment, the invention provides a system for tracing and logging for software modules. Tracing and logging includes generating logs pertaining to the operations of the one or more software modules. The system comprises: (i) means for detecting at least one error in one or more software modules of a computer system having a plurality of software modules, (ii) means for generating at least one error message corresponding to each detected error, (iii) means for analyzing the error messages, (iv) means for monitoring the availability of resources of the computer system, and (v) means for adjusting the tracing and logging level in one or more software modules, based on the analyzed error message and availability of the resources.

In another embodiment, the invention provides a system for tracing and logging of one or more software modules. Tracing and logging comprises generating logs pertaining to the operations of the software module. The system comprises: (i) a tracing and logging level module for detecting at least one error in one or more software modules of a computer system having a plurality of software modules, (ii) an error analyzer for analyzing an error message corresponding to each detected error, (iii) a resource monitor for monitoring the availability of resources of the computer system, and (iv) a level adjuster for adjusting the tracing and logging level in one or more software modules, based on the analyzed error message and availability of the resources.

In yet another embodiment, the invention provides an apparatus for tracing and logging for a software module. The apparatus comprises: (i) a computer, and (ii) a machine-readable medium that includes instructions executable by the computer. The machine-readable medium comprises: (a) one or more instructions for detecting at least one error in one or more software modules in a computer system having a plurality of software modules, (b) one or more instructions for generating error messages corresponding to each detected error, (c) one or more instructions for analyzing an error message corresponding to each detected error, (d) one or more instructions for monitoring the availability of resources of the computer system, and (e) one or more instructions for adjusting the tracing and logging level in the one or more software modules, based on the analyzed error message and availability of the resources.

These provisions, together with the various ancillary provisions and features that will become apparent to those artisans who possess skill in the art, as the following description proceeds, are attained by devices, assemblies, systems, and methods of embodiments of the present invention, various embodiments thereof being shown with reference to the accompanying drawings, by way of example only, wherein:

DETAILED DESCRIPTION OF EMBODIMENTS OF THE INVENTION

The invention provides a method, system, and computer program product for tracing and logging for a software module. An adaptive tracing manager is provided to vary the tracing and logging level of a tracing and logging system associated with the software module. The tracing and logging level is varied, based on the error message generated during the execution of the software module, the availability of resources, and the load on the resources. The tracing and logging level determines the amount of information contained in the logs of the tracing and logging system.

Figure 1:
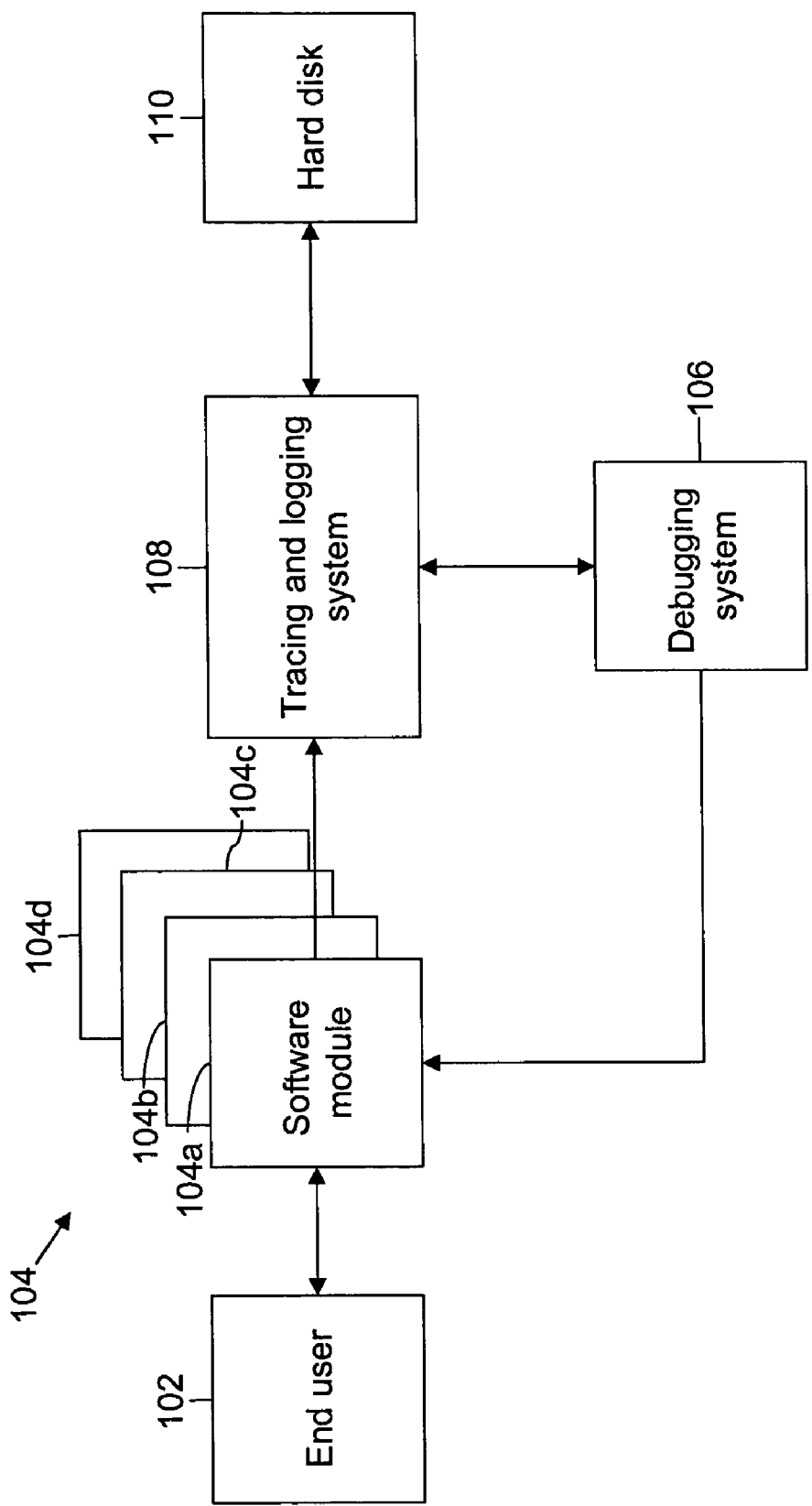
FIG. 1 depicts an environment wherein the invention can be practiced, in accordance with an exemplary embodiment of the invention.
Figure 1A:
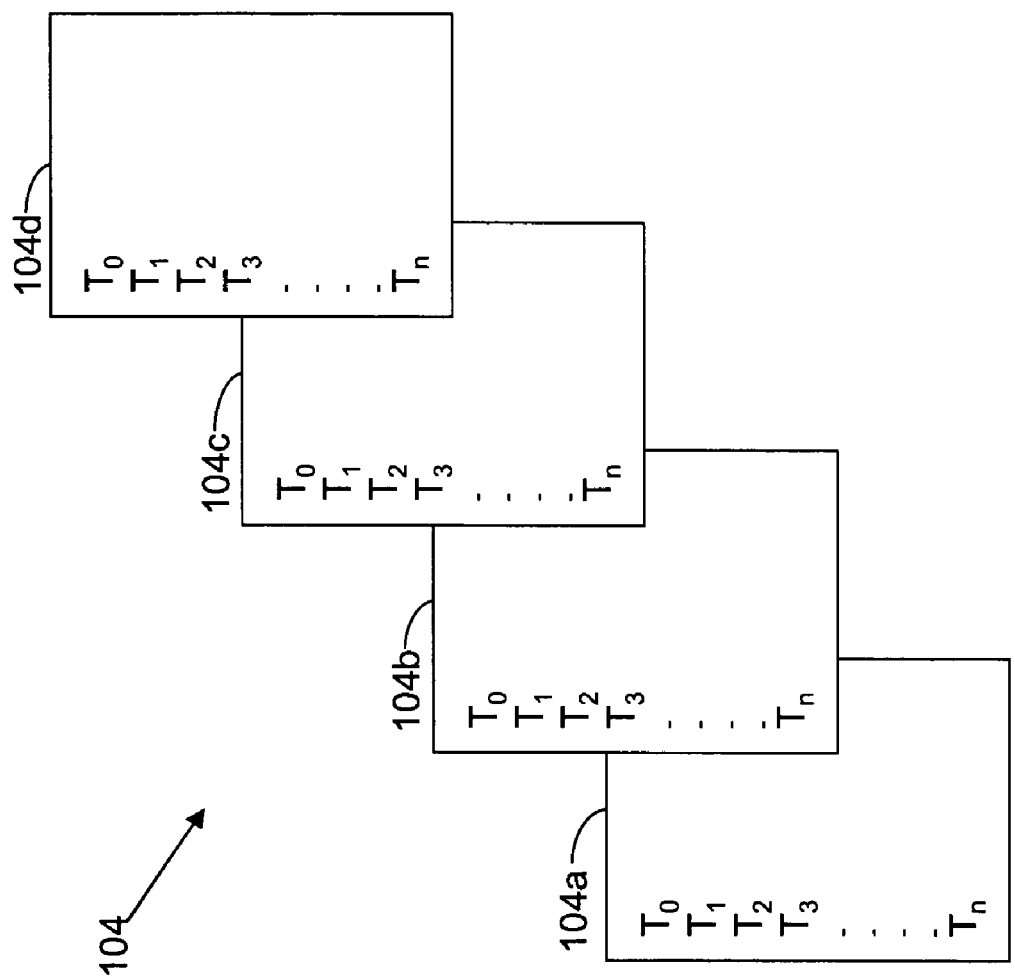
FIG. 1A illustrates a plurality of software modules with each software module having different tracing and logging levels.

FIG. 1 depicts an environment wherein the invention can be practiced, in accordance with an exemplary embodiment of the invention. The environment includes an end user 102 and one or more software modules, generally illustrated as 104. By way of illustration only, software modules 104 may comprise software modules 104*a*, 104*b*, 104*c* and 104*d*. Thus, as best illustrated in FIG. 1A, each of software modules 104*a*, 104*b*, 104*c* and 104*d* has different tracing levels $T_0$, $T_1$, $T_2$, $T_3$ ... $T_n$. Each tracing level logs different amount of information. Preferably, tracing level $T_1$ logs more information than tracing level $T_0$. Similarly, tracing level $T_2$ logs more information than tracing level $T_1$. As the tracing levels increase, the capability of logging information increases. Tracing level $T_n$ logs the most information. In accordance with various embodiments of the present invention, the tracing and logging level for one or more of software modules 104 may be adjusted; e.g., by increasing or enhancing the tracing and logging level of one or more software modules 104, such as from $T_1$ to $T_3$, by way of example only. Adjusting the tracing and logging level may include decreasing the tracing and logging level, such as from $T_3$ to $T_1$, by way of example only.

An end user 102 refers, generally, to any entity capable of executing software. Examples of end user 102 include a programmer and computer. End user 102 may face problems while executing software modules 104. This is primarily due to one or more errors that can occur in one or more components of software modules 104. Since, software modules 104 behave differently in different scenarios, the type and number of errors may vary across different scenarios. Therefore, it is not possible to remove all possible errors at the time of the development of software modules 104.

The errors that occur during the execution of software modules 104 are identified and removed, using a debugging system 106. Debugging is the process of finding and removing errors from software. In various embodiments, debugging is performed by executing software modules 104 for various test cases, or under normal operation as the system is deployed at customer sites. However, identification of the root cause of the error and removal of the error require information about the exact steps that end user 102 has performed while executing software modules 104, in response to the test case or under normal operation. Therefore, to trace back the steps that have been performed, a tracing and logging system 108 is provided. Tracing and logging system 108 is coupled to a hard disk 110 which stores logs generated by tracing and logging system 108.

Tracing is a technique used to trace the exact sequences of steps performed while executing software modules 104. Logging is defined as keeping logs or records of the sequence of steps. Tracing and logging system 108 includes multiple tracing and logging levels. The tracing and logging levels determine the amount of information, related to the execution of software modules 104, contained in the logs. A low tracing and logging level implies that the logs contain only broad-level information pertaining to the execution of software modules 104. Broad-level information provides only an overview of the execution of the software. A high tracing and logging level implies that detailed information regarding the execution of software modules 104 is contained in the logs. For example, at a low tracing and logging level, based on the information contained in the logs, a support engineer can identify the components of software modules 104, where the error has been detected. Thereafter, at a high tracing and logging level, based on detailed information contained in the logs, the support engineer can identify the root cause of the occurrence of the error. For example, the specific line number within the component of software modules 104 where the error has occurred.

The efficient removal of errors by debugging system 106 requires detailed information relating to the execution of software modules 104. However, to get detailed information, a high level of tracing and logging needs to be used. A high logging and tracing level requires a greater use of resources of a computer system containing software modules 104, compared with that for a low tracing and logging level. The resources of the computer system include a processor (a CPU), a memory, and a disk access bandwidth. Therefore, for the efficient use of resources, a low tracing and logging level is used. Further, whenever an error is detected in a component of one or more software modules 104, the tracing and logging level corresponding to that component is increased or enhanced automatically. The increased level provides detailed information about the root cause of the error. Debugging system 106 uses this information to isolate the root cause of the issue and facilitate the removal of the error.

Figure 2:
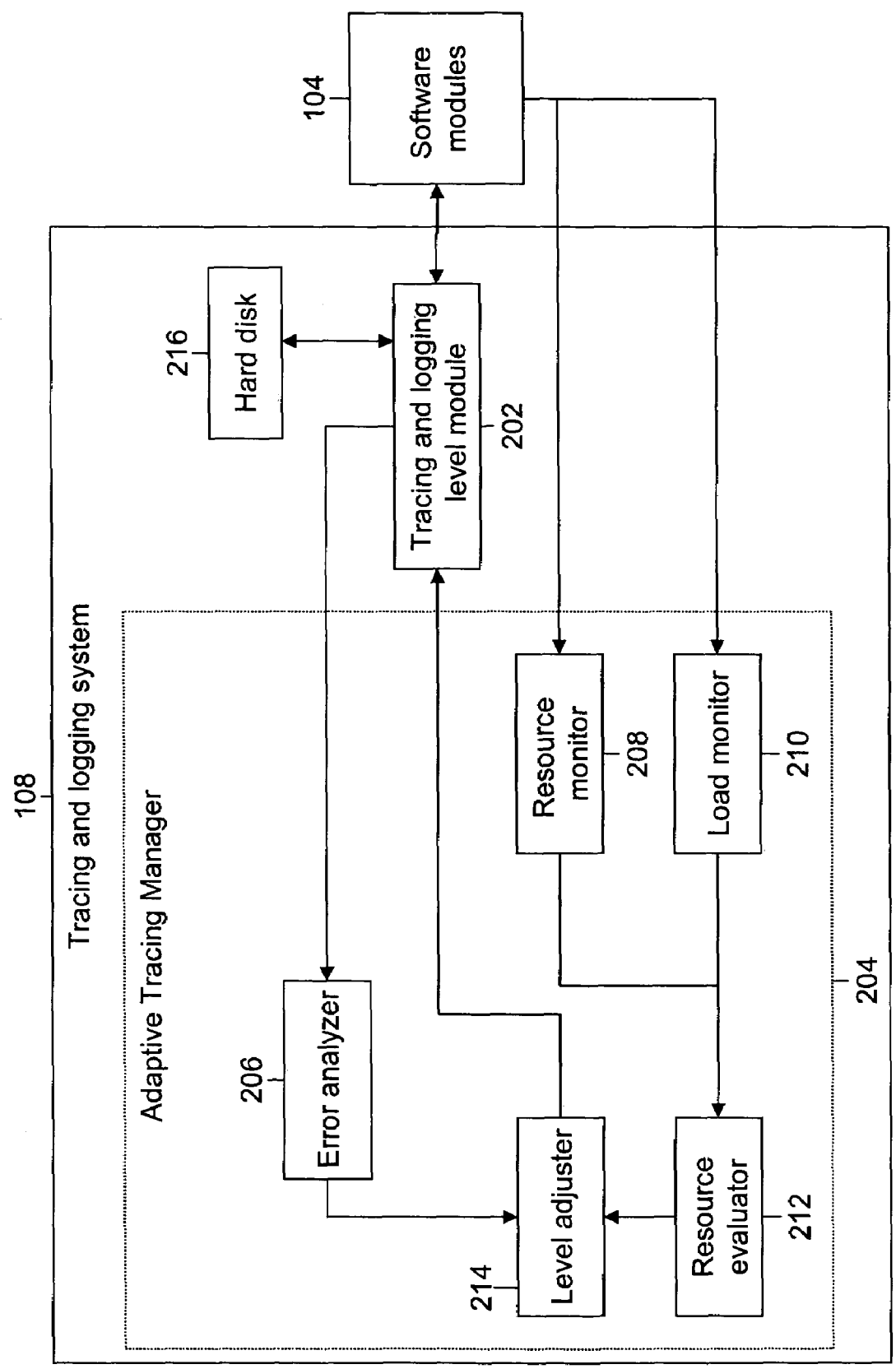
FIG. 2 depicts elements of a tracing and logging system, in accordance with an exemplary embodiment of the invention.

FIG. 2 depicts elements of tracing and logging system 108. Tracing and logging system 108 may be a real time system, which is deployed and running in production. It has the capabilities of simultaneously or sequentially analyzing software modules 104 and simultaneously or sequentially adjusting (e.g., enhancing) the respective tracing levels (e.g., $T_0$, $T_1, \ldots T_n$) of the software modules 104. Tracing and logging system 108 includes a tracing and logging level module 202 and an Adaptive Tracing Manager (ATM) 204. ATM 204 adaptively controls the tracing and logging level of tracing and logging level module 202. ATM 204 includes an error analyzer 206, a resource monitor 208, a load monitor 210, a resource evaluator 212, and a level adjuster 214. Further, a hard disk 216 is coupled to tracing and logging level module 202. Hard disk 216 may store logs generated by tracing and logging level module 202. Hard disk 216 may have the same functionality as that of hard disk 110 shown in FIG. 1. In accordance with an embodiment of the invention, hard disk 216 may not be a part of tracing and logging system 108 and may be a separate element as shown in FIG. 1.

Tracing and logging level module 202 traces the sequence of steps performed to execute software modules 104. Tracing and logging level module 202 also, as indicated, generates logs on hard disk 216 to keep a record of the steps performed. In accordance with various embodiments of the invention, the lowest tracing and logging level is used as the default level, to trace the sequence of events and generate the logs. Whenever an error is detected, a log is generated. The generated log comprises an error message corresponding to the detected error. Since, the lowest tracing and logging level is being used, the generated log contains only broad-level information about the detected error. Therefore, the tracing and logging level needs to be increased or enhanced to obtain detailed information about the root cause of the detected error.

Error analyzer 206 analyzes the error message. An analysis of the error messages is carried out to identify one or more of software modules 104 where the error message has been produced, and to identify the root cause of the error. In accordance with an exemplary embodiment of the invention, the analysis is based on a logic (e.g., pre-programmed logic, an artificial logic, or logic read from a file, such as XML file, etc.). In an embodiment, the logic defines the steps to be performed in response to the error detected. For example, if the analysis of the error messages shows that the detected error is in a JTAPI module of software modules 104, tracing and logging system 108 increases the logging and tracing level of that component. In accordance with another embodiment of the invention, the analysis is based on a user-programmable logic (e.g., an XML file). In various embodiments of the invention, the logic can be updated by the user to cater to various errors detected. The user includes a support engineer, who can modify software modules 104 according to different scenarios.

Resource monitor 208 monitors the resources, such as the resources in the entire system (e.g., a computer system, ATM 204, etc.), including memory and processor associated with software modules 104. Load monitor 210 monitors the load on the resources. The load on the resources includes the number of incoming calls and their average duration, processor consumption, memory consumption, etc. The load on the resources is due to various steps performed during the execution of software modules 104. Based on the availability of resources and the load on the resources, resource evaluator 212 evaluates the resources that can be used to increase the tracing and logging level. In accordance with various embodiments of the invention, resource evaluator 212 includes a logic (e.g., pre-programmed logic, an artificial logic, or logic read from a file, such as XML file, etc.) pertaining to the consumption of resources associated with different tracing and logging levels. Based on this logic, resource evaluator 212 evaluates the availability of resources and the load on the resources. Further, based on the availability of resources and the load on the resources, resource evaluator 212 identifies additional resources that can be used to increase the tracing and logging level.

Based on the analysis of the generated error and the evaluation of resources that can be used, level adjuster 214 increases the tracing and logging level in tracing and logging level module 202. Tracing and logging level module 202 uses this increased tracing and logging level to obtain a detailed sequence of steps and generate detailed logs pertaining to the steps performed during the execution of software modules 104. In another embodiment of the invention, level adjuster 214 can reduce the tracing and logging level if the resources available are scarce or the load on the resources is high. In accordance with various embodiments of the invention, elements of tracing and logging system 108 and ATM 204 can be implemented in software. Adjusting the tracing and logging level(s) (e.g., $T_0, T_1 \ldots T_n$) in one or more software modules 104 may be conducted automatically without any human intervention from an engineer.

Figure 3:
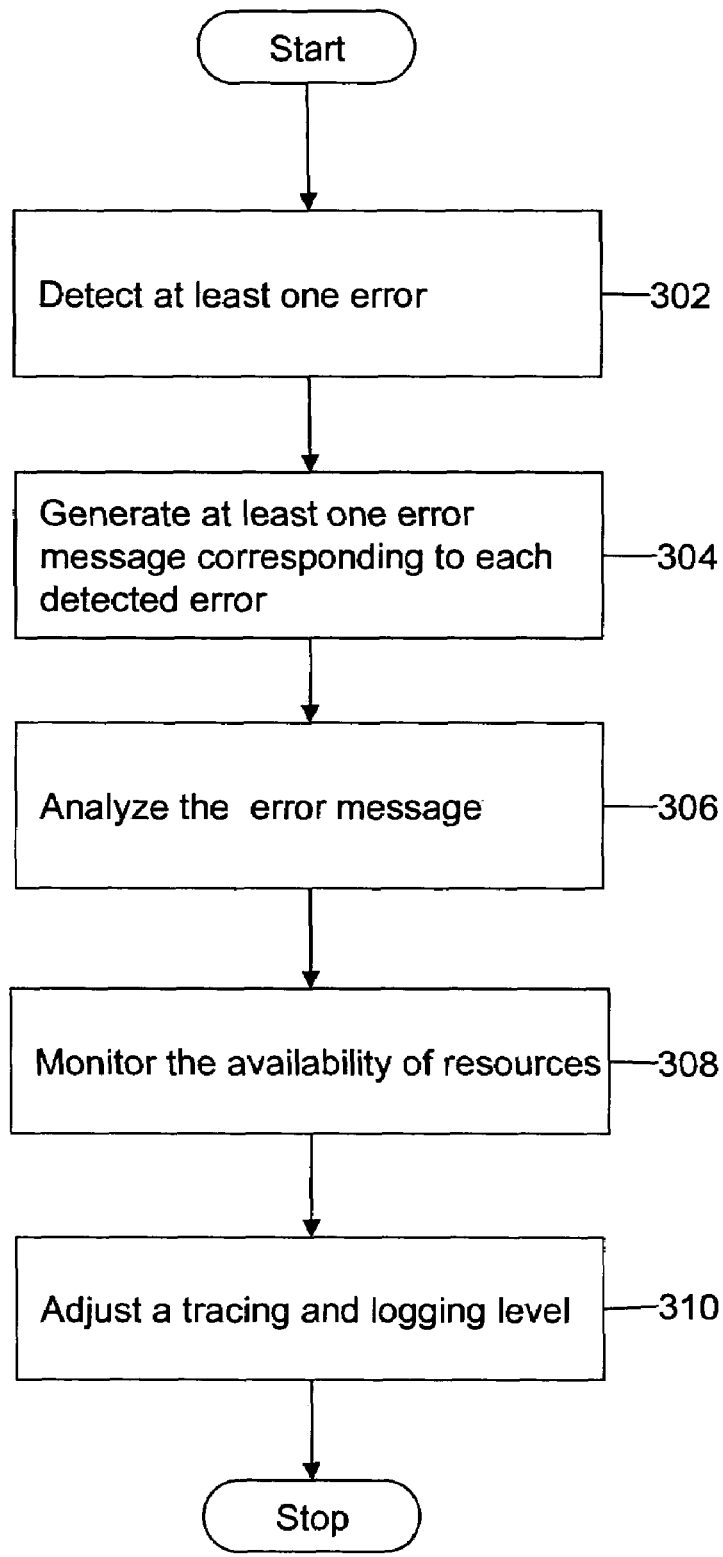
FIG. 3 illustrates a flowchart of a method for tracing and logging for a software module, in accordance with an exemplary embodiment of the invention.

FIG. 3 illustrates a flowchart of a method for tracing and logging for a software module, in accordance with an exemplary embodiment of the invention. At step 302, at least one error is detected. At step 304, at least one error message corresponding to each detected error is generated in the logs of tracing and logging system 108. The logs comprise information about the steps performed during the execution of software modules 104. The amount of information is determined by the tracing and logging level. A higher tracing and logging level provides detailed information, which enables identification of the root cause of the error. At step 306, the error is analyzed. The error message is analyzed to identify one or more of software modules 104 where the error message is produced. In general, this error message does not provide enough information pertaining to the identification of the root cause of the error. Therefore, the tracing and logging level needs to be increased. At step 308, the resources, such as the processor and memory of the computer system, are monitored to determine available resources that may be used for adjusting the tracing and logging level. The monitoring of resources is important, because these resources are used to facilitate normal operation of the computer system and to vary the tracing and logging level. Further, at step 310, based on the analysis of the error messages and the availability of the resources, the tracing and logging level is adjusted to the required level. In various embodiments of the invention, the tracing and logging level is increased, so as to identify the root cause of the error in one or more software modules 104. The increase in the tracing and logging level depends on the availability of the resources and the load on the available resources. In another embodiment, the tracing and logging level can be reduced if the resources are scarce.

In another embodiment of the present invention, the procedure conducted by system 108 includes the simultaneous adjustment (e.g., enhancing or decreasing) of two or more tracing levels (e.g., $T_0, T_1 \ldots T_n$) from two or more software modules 104 to intermediate tracing levels as opposed to adjusting the tracing level of a sole software module 104 to the highest or lowest tracing level. By way of example only, and assuming that the respective tracing levels are to be enhanced, the tracing and logging level module 202 would enhance the respective tracing level (e.g., $T_0$ or $T_1$, etc) of two or more software modules 104 (e.g., module 104a, software module 104b and/or software module 104c, etc) to a level between the lowest and highest tracing level (e.g., between $T_0$ and $T_n$), such at an intermediate level (e.g., $T_2$ or $T_3$) rather than increasing the tracing level of any single software module (e.g., such as software module 104a alone) to the highest tracing level (e.g., $T_n$).

Figure 4:
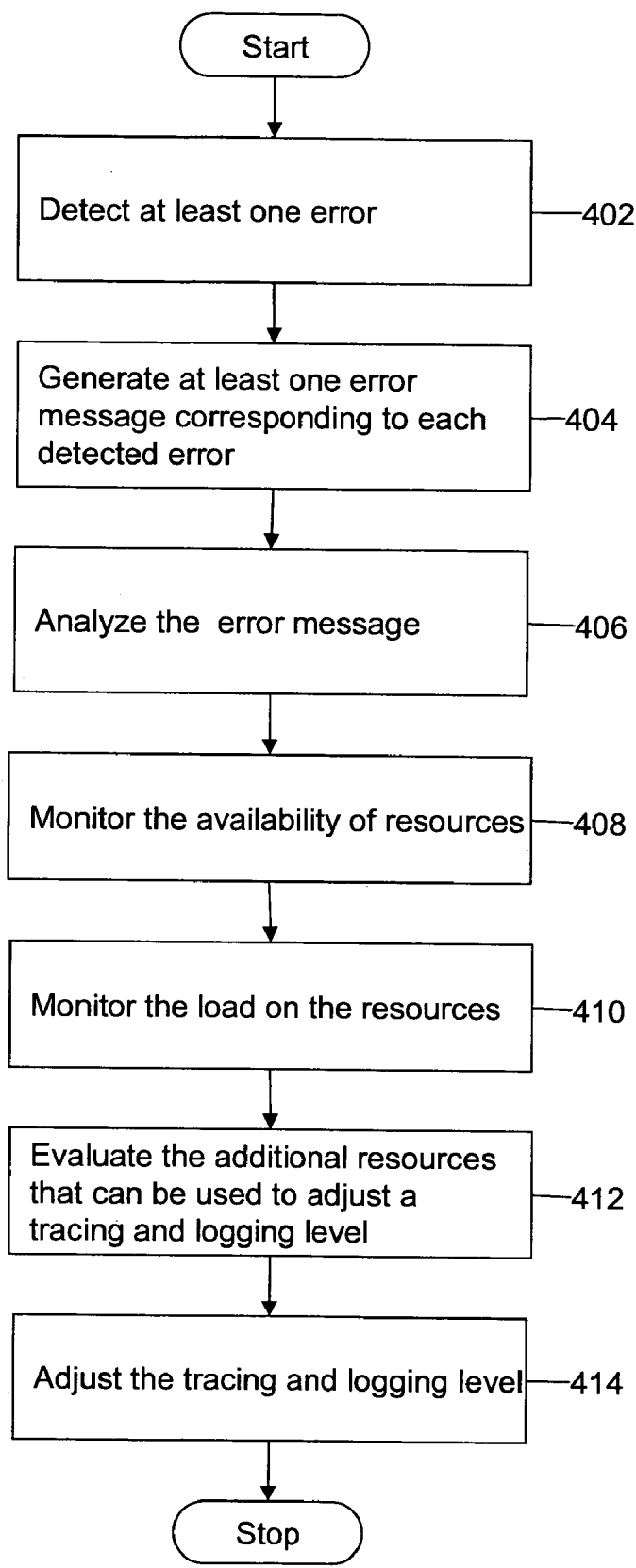
FIG. 4 illustrates a flowchart of a method for tracing and logging for a software module, in accordance with another embodiment of the invention.

FIG. 4 illustrates a flowchart of a method for tracing and logging for a software module (e.g., one or more of software modules 104), in accordance with another embodiment of the invention. Tracing and logging for a software module includes tracing the software messages between software modules 104 and from inside software modules 104 during the execution of software modules 104. Further, based on the tracing of the sequence of steps, tracing and logging generates logs to maintain a record of the steps performed. The tracing of the sequence of the steps is based on the tracing and logging level. A higher tracing and logging level generates detailed traces and logs pertaining to the sequence of the steps. However, the higher tracing and logging level consumes more resources of the computer system. Therefore, initially the lowest tracing and logging level is used. At step 402, at least one error is detected. At step 404, a log is generated. The log comprises at least one error message corresponding to each detected error.

At step 406, the error message is analyzed. The analysis of the error messages includes an analysis of the sequence of the steps performed. In accordance with an exemplary embodiment of the invention, the analysis of the error messages is based on logic, such as pre-programmed logic. In accordance with another embodiment of the invention, the analysis of the error messages is based on a user-programmable workflow. Software modules 104 include the workflow, which can be modified by the user to analyze the error messages. Based on the analysis of the error messages, one or more of software modules 104 are identified where the error message is produced. Further, the root cause of the error needs to be identified. The user can subsequently modify software modules 104 to prevent this underlying issue from re-occurring.

The identification of the root cause requires a higher tracing and logging level. Therefore, to increase the tracing and logging level, at step 408, the resources of the computer system are monitored to determine available resources that may be used for adjusting the tracing and logging level. Further, at step 410, load on the resources is monitored. The load on the resources includes the number of incoming calls, the average call duration, processor consumption, memory consumption, etc. In accordance with an embodiment of the invention, ATM 204 is programmed to assess the resource consumption at different tracing and logging levels. Therefore, at step 412, based on the availability of the resources and the load on the resources, ATM 204 evaluates the available resources, to identify the additional resources that can be used to increase the tracing and logging level. Further, based on the analysis of the error and evaluation of the resources, the tracing and logging level is increased at step 414 to the required level. Thereafter, a detailed log is generated, which includes detailed information about the cause of the error. The detailed information is used by the support engineer to identify the root cause of the occurrence of the error.

In accordance with various embodiments of the invention, if the resources of the computer system decrease or if the load on the resources increases so that the performance of software modules 104 gets adversely affected, the tracing and logging level can be decreased. The reduction in the level of tracing prevents the system from exhibiting the adverse behavior that can be caused by straining the resources of the system. As the load on the resources decreases, the tracing and logging level can be increased again.

In accordance with various embodiments of the invention, if the error messages are produced in more than one software modules 104, and the availability of the resources is not sufficient to increase the tracing and logging level in all software modules 104, the tracing and logging level in each software module 104 is increased or enhanced sequentially. An example of such a sequence is a round robin method. According to this method, one software module 104 is selected at a time and the tracing and logging level corresponding to the selected software module 104 is increased. Thereafter, another software module 104 is selected and the tracing and logging level pertaining to it is increased. The procedure is repeated for each of software modules 104. In various embodiments of the invention, software module 104 is selected, based on an ascending tracing and logging level. Software module 104 that needs the minimum increase in the tracing and logging level is selected first, and software module 104 that needs the highest increase in the tracing and logging level is selected last.

In accordance with an exemplary embodiment of the invention, the generated detail logs are copied to a remote server. Hence, if a detected error has already been analyzed, the detail logs that are copied to the remote server can be used to obtain the detailed information relating to the detected error. Therefore, the tracing and logging level may not need to be increased for analyzing the detected error. This prevents the generation of duplicate logs, and a significant amount of disk space can be saved. Consequently, the consumption of the resources is reduced and the performance of software modules 104 improves. In accordance with another embodiment of the invention, the generated detail logs are sent to an appropriate person whenever the logs are needed. For example, the log can be sent to the software developer associated with software modules 104. In another embodiment, the log can be sent to a support engineer who is responsible for debugging software modules 104.

Thus, by practice of various embodiments of the present invention there are provided a system and method for adaptively tracing and dynamically adjusting the tracing and logging level automatically based on encountered errors and the availability of system resources. The adaptive tracing and logging system and method accelerates the debugging process, and thus greatly increases customer satisfaction. In accordance with the practice of various embodiments of the invention, Adaptive Tracing Manager (ATM) module (or the like), such as ATM 204, may be employed for analyzing all of the high level error tracing messages. The analysis provides a high level overview of the health of the system. In one embodiment and as previously indicated, the logic that analyzes the error logs may be pre-programmed in the ATM. In another embodiment and as also previously indicated, workflow based programming may be available for the field support engineer. The system is shipped with a basic workflow, which can be modified to accommodate specific scenarios encountered in the field. By the practice of yet other embodiments of the invention, the ATM is aware (programmed) of the variable performance resource consumption associated with each tracing level of the various components. In addition the ATM may continually monitor the system load (e.g., number of incoming calls, average call duration, CPU and memory consumption, etc.) and uses it to assess the additional resources that can be used for increasing the tracing and logging level without adversely impacting system performance. By practice of the various embodiments of the invention, if the system encounters issues, the ATM analyzes the corresponding error messages in the tracing and logging. Based on its logic (e.g., pre-programmed logic or the logic programmed in the workflow) and on available resources, the ATM adjusts the level of the tracing in a specific software module. The ATM may reduce the level of tracing and logging if system resources decrease or become scarce because of increased system load, (e.g., because of increased number of calls into the system). As the load on the system decreases, the ATM may increase the level of tracing and logging once again.

By the practice of further embodiments of the invention, in a situation wherein multiple errors are reported and not enough system resources are available to turn on all required tracing and logging to debug the system, the ATM will cycle through the various software modules collecting detailed tracings from various modules sequentially. The ATM may then employ the round robin method to collect enhanced logs from the various software modules when the system does not have enough resources to concurrently collect enhanced tracing and logging from all software modules. Further more, the ATM may analyze the low level messages and, based on real-time observations, make a decision about the next software module that needs to be traced with a higher level of tracing and logging. After enabling the needed tracing for a particular error and after encountering it again, the ATM may automatically turn off the extra tracing as it has already collected the information required for debugging the system. The ATM may copy the generated traces to another server for a particular error, once that error is duplicated again. This prevents the valuable logs from being overwritten and frees up disk space on the system for additional logs. The ATM may send the needed logs to the appropriate person once they are collected. In addition to copying the generated traces to another server, the ATM may copy logs periodically to another server for any suitable reason (e.g., for disk space and log preservation). It is to be understood that the ATM logic that determines the level of tracing and the action to be taken on trace files may be completely customizable by the end user, using the previously described workflow.

Embodiments of the present invention have the advantage that the tracing and logging level is adjusted automatically, i.e., there is no need for manual intervention. This reduces the time consumed during the testing and debugging stage of software development. It is to be understood that embodiments of the present invention are not restricted to the testing and debugging stage of software, but is also aimed at real-time systems, which are deployed and are running in production. Also, no manual work is required to adjust the tracing and logging level. The system adaptively increases the tracing and logging level when the load on the resources decreases. This enables detailed tracing and logging whenever the resources are available. Further, the system adaptively decreases the tracing and logging level when the load on the resources increases. This ensures that the performance of the software module does not get adversely affected. The system can adjust the tracing and logging level of different components of the software module sequentially.

Although the invention has been discussed with respect to specific embodiments thereof, these embodiments are merely illustrative, and not restrictive, of the invention. For example, a 'method for tracing and logging' can include any type of analysis, manual or automatic, to anticipate the needs of the method.

Although specific protocols have been used to describe embodiments, other embodiments can use other transmission protocols or standards. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification may contain material which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for tracing and logging for a software module, comprising:
    detecting at least one error in a software module in a computer system having a plurality of software modules;
    generating at least one error message corresponding to each detected error;
    analyzing the error message to identify the software module which produced the error message;
    monitoring resources of the computer system to determine available resources that may be employed for adjusting a tracing and logging level in the software module; and
    adjusting the tracing and logging level in the software module based on the analyzed error message and the availability of resources.

2. The method of claim 1 wherein said adjusting the tracing and logging level in the software module comprises reducing the tracing and logging level in the software module.

3. The method of claim 2 additionally comprising determining, prior to reducing the tracing and logging level, that the availability of resources has decreased.

4. The method of claim 1 additionally comprising evaluating the resources.

5. The method of claim 1 wherein the analysis of the error message is based on logic.

6. The method of claim 1 wherein the analysis of the error message is based on a user programmable workflow.

7. The method of claim 1 wherein said adjusting the tracing and logging level comprises automatically adjusting the tracing and logging level.

8. A method for tracing and logging for a software module, comprising:

detecting at least one error in a software module in a computer system having a plurality of software modules;

generating at least one error message corresponding to each detected error;

analyzing the error message to identify the software module which produced the error message;

monitoring resources of the computer system to determine available resources that may be employed for adjusting a tracing and logging level in the software module;

monitoring the load on the available resources;

evaluating the resources that can be used to adjust the tracing and logging level, the evaluation being based on the load and the availability of resources; and adjusting the tracing and logging level in the software module based on the analyzed error message, the availability of resources, and the evaluation of resources.

9. The method of claim 8 wherein said adjusting the tracing and logging level in the software module comprises reducing the tracing and logging level in the software module.

10. The method of claim 9 additionally comprising determining, prior to reducing the tracing and logging level, that the availability of resources has decreased.

11. The method of claim 8 wherein the resources are evaluated based on a programmed logic about the consumption of the resources at different tracing and logging levels.

12. The method of claim 8 wherein said adjusting the tracing and logging level comprises automatically adjusting the tracing and logging level.

13. A method for determining a root cause of an error message in a software module, comprising:

generating at least one error message in a software module in a computer system having a plurality of software modules;

analyzing the error message to identify the software module which produced the error message;

monitoring resources of the computer system to determine available resources that may be employed for enhancing a tracing and logging level in the software module; and enhancing the tracing and logging level in the software module to determine the root cause of the error message.

14. The method of claim 13 wherein said enhancing is automatic.

15. A system for tracing and logging for a software module, comprising:

means for detecting at least one error in a software module in a computer system having a plurality of software modules;

means for generating at least one error message corresponding to each detected error;

means for analyzing the error message to identify the software module which produced the error message;

means for monitoring resources of the computer system to determine available resources that may be employed for adjusting a tracing and logging level in the software module; and means for adjusting the tracing and logging level in the software module based on the analyzed error message and the availability of resources.

16. The system of claim 15 wherein said adjusting the tracing and logging level in the software module comprises reducing the tracing and logging level in the software module.

17. The system of claim 16 additionally comprising means for determining, prior to reducing the tracing and logging level, that the availability of resources has decreased.

18. The system of claim 15 wherein the means for analyzing at least one error message comprises logic.

19. A system for tracing and logging for a plurality of software modules, comprising:

a tracing and logging level module for detecting at least one error and generating at least one error message in a software module in a computer system having a plurality of software modules;

an error analyzer for analyzing the error message to identify the software module which produced the error message;

a resource monitor for monitoring the resources of the computer system to determine available resources that may be employed for adjusting a tracing and logging level in the software module; and a level adjuster for adjusting the tracing and logging level in the software module based on the analyzed error message and the availability of resources.

20. The system of claim 19 wherein said adjusting the tracing and logging level in the software module comprises reducing the tracing and logging level in the software module.

21. The system of claim 20 wherein the resource monitor additionally determines, prior to reducing the tracing and logging level, that the availability of resources has decreased.

22. An apparatus of tracing and logging for a software module, comprising:

a processor; and a computer-readable storage medium including instructions executable by the processor comprising:

one or more instructions for detecting at least one error in a software module in a computer system having a plurality of software modules;

one or more instructions for generating at least one error message corresponding to each detected error;

one or more instructions for analyzing the error message to identify the software module which produced the error message;

one or more instructions for monitoring resources of the computer system to determine available resources that may be employed for adjusting a tracing and logging level in the software module; and one or more instructions for adjusting the tracing and logging level in the software module based on the analyzed error message and the availability of resources.

23. A computer-readable storage medium including instructions executable by a processor for tracing and logging for a software module, the computer-readable storage medium comprising:

one or more instructions for detecting at least one error in a software module in a computer system having a plurality of software modules;

one or more instructions for generating at least one error message corresponding to each detected error;

one or more instructions for analyzing the error message to identify the software module which produced the error message;

one or more instructions for monitoring resources of the computer system to determine available resources that may be employed for adjusting a tracing and logging level in the software module; and one or more instructions for adjusting the tracing and logging level in the software module based on the analyzed error message and the availability of resources.

* * * * *